United States Patent
Yamamoto et al.

(10) Patent No.: US 10,843,624 B1
(45) Date of Patent: Nov. 24, 2020

(54) SYSTEM AND METHOD FOR PROVIDING HAPTIC COUNTERACTIONS AND ALERTS WITHIN A SEAT OF A VEHICLE

(71) Applicant: Honda Motor Co., Ltd., Tokyo (JP)

(72) Inventors: Stuart Masakazu Yamamoto, La Mirada, CA (US); Hartley Ochavillo, Marina Del Rey, CA (US); Joseph Anthony Alequin, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/424,826

(22) Filed: May 29, 2019

(51) Int. Cl.
  *B60Q 9/00* (2006.01)
  *B60N 2/00* (2006.01)
(52) U.S. Cl.
  CPC ............. *B60Q 9/00* (2013.01); *B60N 2/002* (2013.01)
(58) Field of Classification Search
  None
  See application file for complete search history.

(56) References Cited

U.S. PATENT DOCUMENTS

| | | | | |
|---|---|---|---|---|
| 5,528,698 A * | 6/1996 | Kamei | ............. | B60N 2/002 250/227.15 |
| 5,612,876 A * | 3/1997 | Zeidler | ............. | B60N 2/002 180/273 |
| 6,340,152 B1 * | 1/2002 | Ritchie | ............. | B60N 2/501 188/300 |
| 6,356,194 B1 * | 3/2002 | Fukui | ............. | B60N 2/002 180/271 |
| 7,106,203 B2 | 9/2006 | Edwards et al. | | |
| 7,378,979 B2 | 5/2008 | Rams, Jr. | | |
| 8,044,782 B2 | 10/2011 | Saban | | |
| 8,284,041 B2 | 10/2012 | Cuddihy et al. | | |
| 8,439,334 B2 * | 5/2013 | Deml | ............. | F16F 15/04 267/140.11 |
| 8,678,500 B2 * | 3/2014 | Lem | ............. | B60N 2/914 297/284.6 |
| 8,684,339 B2 * | 4/2014 | Deml | ............. | F16F 15/04 267/140.11 |
| 9,123,244 B2 | 9/2015 | Daman et al. | | |
| 9,421,908 B2 | 8/2016 | McQueen et al. | | |

(Continued)

FOREIGN PATENT DOCUMENTS

| | | |
|---|---|---|
| CA | 2601960 | 3/2009 |
| CN | 204399048 | 6/2015 |
| CN | 105946771 | 12/2017 |

*Primary Examiner* — Chico A Foxx
(74) *Attorney, Agent, or Firm* — Rankin, Hill & Clark LLP

(57) ABSTRACT

A system and method for providing haptic counteractions and alerts within a seat of a vehicle that include determining that at least one front seat passenger is occupying at least one front passenger seat and at least one rear seat passenger is occupying at least one rear passenger seat. The system and method also include determining a location of the at least one rear seat passenger with respect to a location of the at least one front seat passenger within the vehicle and determining if at least one disturbance is affecting the at least one front passenger seat. The system and method further include actuating at least one vibrational element to counteract the at least one disturbance affecting the at least one front passenger seat and to provide a reminder alert pertaining to the at least one rear seat passenger to the at least one front seat passenger.

20 Claims, 6 Drawing Sheets

(56) References Cited

U.S. PATENT DOCUMENTS

| | | | |
|---|---|---|---|
| 9,975,380 B1 | 5/2018 | Voss et al. | |
| 10,106,080 B1* | 10/2018 | Hassani | B60N 2/0244 |
| 10,274,335 B2* | 4/2019 | Yamamoto | G01C 21/3641 |
| 10,293,718 B1* | 5/2019 | Ilievski | B60N 2/0244 |
| 2006/0219459 A1* | 10/2006 | Suzuki | G08B 21/06 |
| | | | 180/273 |
| 2009/0149779 A1* | 6/2009 | Russo | A61B 5/4818 |
| | | | 600/595 |
| 2011/0109450 A1 | 5/2011 | Hirschfeld et al. | |
| 2011/0276156 A1* | 11/2011 | Thweny | A63G 31/16 |
| | | | 700/94 |
| 2012/0043171 A1* | 2/2012 | Sella | F16F 7/116 |
| | | | 188/379 |
| 2013/0136270 A1* | 5/2013 | Sakamoto | G10K 11/178 |
| | | | 381/71.4 |
| 2014/0244106 A1* | 8/2014 | Singer | H04R 1/1083 |
| | | | 701/36 |
| 2014/0253314 A1* | 9/2014 | Rambadt | G08B 21/0266 |
| | | | 340/457.1 |
| 2016/0042616 A1* | 2/2016 | Dorsey | G08B 21/24 |
| | | | 340/457 |
| 2016/0334901 A1* | 11/2016 | Rihn | G06F 3/017 |
| 2016/0339838 A1 | 11/2016 | Diaz | |
| 2018/0181368 A1* | 6/2018 | Trestain | H04R 5/023 |
| 2019/0057596 A1* | 2/2019 | Desai | B60Q 5/005 |
| 2019/0152346 A1* | 5/2019 | Kim | G08B 21/24 |
| 2019/0193754 A1* | 6/2019 | Augst | B60W 50/0097 |
| 2020/0023753 A1* | 1/2020 | Alequin | B60N 2/002 |
| 2020/0023921 A1* | 1/2020 | Gordner | F16F 15/005 |
| 2020/0079248 A1* | 3/2020 | Yamamoto | B60N 2/002 |
| 2020/0079318 A1* | 3/2020 | van Vliet | B60R 22/48 |
| 2020/0086892 A1* | 3/2020 | Alequin | B60W 50/16 |
| 2020/0118409 A1* | 4/2020 | Yang | A61B 5/002 |

\* cited by examiner

SYSTEM AND METHOD FOR PROVIDING HAPTIC COUNTERACTIONS AND ALERTS WITHIN A SEAT OF A VEHICLE

BACKGROUND

In many instances front seat drivers and/or front seat passengers may travel with children that are seated behind them who are occupying rear seats of the vehicle. As may be experienced by many individuals, children sitting in the rear seats may be prone to persistent kicking or pushing of one or more front seats of the vehicle. Such persistent kicking or pushing of one or more front seats may cause discomfort to the driver and/or front seat passengers. In some cases, the sensation may cause a level of distraction with respect to the operation of the vehicle.

In other cases, children sitting in the rear seats may be sleeping and/or may not make any noise as they are quietly seated. Accordingly, it may be possible for those seated in the front seat to forget that the children are seated within the vehicle which may lead to them being accidently left within the vehicle as the driver and the front seat passengers exit the vehicle.

BRIEF DESCRIPTION

According to one aspect, a computer-implemented method for providing haptic counteractions and alerts within a seat of a vehicle that includes determining that at least one front seat passenger is occupying at least one front passenger seat of the vehicle and at least one rear seat passenger is occupying at least one rear passenger seat of the vehicle. The computer-implemented method also includes determining a location of the at least one rear seat passenger with respect to a location of the at least one front seat passenger within the vehicle and determining if at least one disturbance is affecting the at least one front passenger seat of the vehicle that is caused by the at least one rear seat passenger of the vehicle. The computer-implemented method further includes actuating at least one vibrational element to counteract the at least one disturbance affecting the at least one front passenger seat of the vehicle and to provide a reminder alert pertaining to the at least one rear seat passenger to the at least one front seat passenger.

According to another aspect, a system for providing haptic counteractions and alerts within a seat of a vehicle that includes a memory storing instructions when executed by a processor cause the processor to determine that at least one front seat passenger is occupying at least one front passenger seat of the vehicle and at least one rear seat passenger is occupying at least one rear passenger seat of the vehicle. The instructions also cause the processor to determine a location of the at least one rear seat passenger with respect to a location of the at least one front seat passenger within the vehicle and determine if at least one disturbance is affecting the at least one front passenger seat of the vehicle that is caused by the at least one rear seat passenger of the vehicle. The instructions further cause the processor to actuate at least one vibrational element to counteract the at least one disturbance affecting the at least one front passenger seat of the vehicle and to provide a reminder alert pertaining to the at least one rear seat passenger to the at least one front seat passenger.

According to an additional aspect, a non-transitory computer readable storage medium storing instructions that when executed by a computer, which includes a processor perform a method that includes determining that at least one front seat passenger is occupying at least one front passenger seat of a vehicle and at least one rear seat passenger is occupying at least one rear passenger seat of the vehicle. The computer-implemented method also includes determining a location of the at least one rear seat passenger with respect to a location of the at least one front seat passenger within the vehicle and determining if at least one disturbance is affecting the at least one front passenger seat of the vehicle that is caused by the at least one rear seat passenger of the vehicle. The computer-implemented method further includes actuating at least one vibrational element to counteract the at least one disturbance affecting the at least one front passenger seat of the vehicle and to provide a reminder alert pertaining to the at least one rear seat passenger to the at least one front seat passenger.

DETAILED DESCRIPTION

Figure 1:
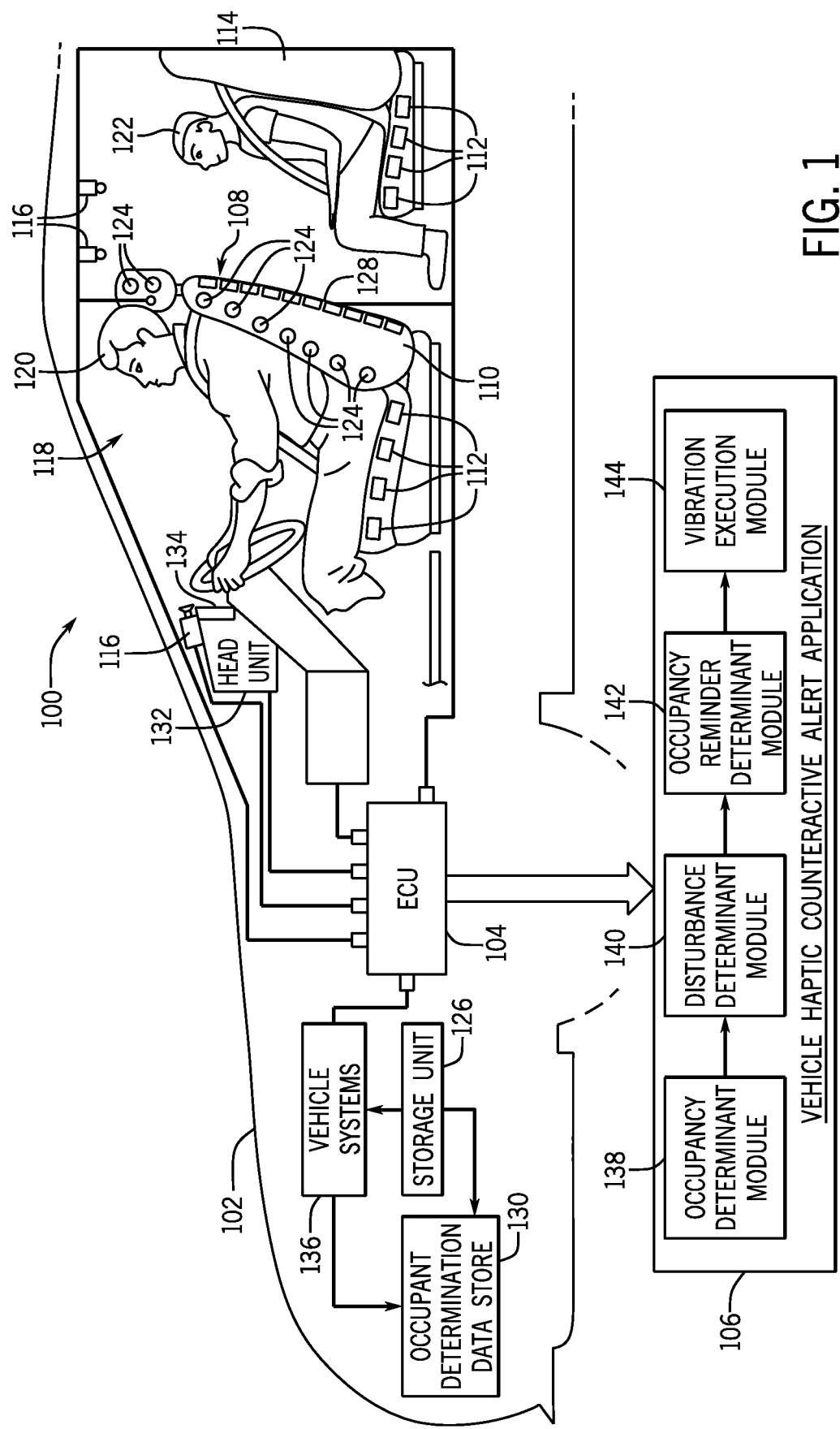
FIG. 1 is a schematic view of an operating environment for providing haptic counteractions and alerts within a seat of a vehicle 102 according to an exemplary embodiment of the present disclosure.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, and a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 is a schematic view of an operating environment 100 for providing haptic counteractions and alerts within a seat of a vehicle 102 according to an exemplary embodiment of the present disclosure. The components of the environment 100, as well as the components of other systems, hardware architectures, and software architectures discussed herein, may be combined, omitted, or organized into different architectures for various embodiments.

Generally, the vehicle 102 includes an electronic control unit (ECU) 104 that executes or accesses a vehicle haptic counteractive alert application 106 (counteractive alert application 106). In an exemplary embodiment, the counteractive alert application 106 may communicate with seat back sensors 108 that are disposed on a rear portion 128 of one or more front passenger seats 110 (front seats 110) of the vehicle 102, one or more seat weight sensors 112 that are disposed within a cushion portion (not shown) of one or more front seats 110 and/or one or more rear passenger seats 114 (rear seats 114) of the vehicle 102. The counteractive alert application 106 may also communicate with one or more cameras 116 that are disposed at one or more locations within an interior cabin (cabin) 118 of the vehicle 102. As discussed below, the seat back sensors 108, the seat weight sensors 112, and/or the camera(s) 116 may be configured to provide one or more signals that may be utilized to determine that one or more front seat passengers 120 (e.g., driver, non-driving front passenger) and/or rear seat passengers 122 are seated within the vehicle 102.

In one embodiment, if it is determined that one or more front seat passengers 120 are seated within the vehicle 102 and/or one or more rear seat passengers 122 are seated behind or within a predetermined vicinity of one or more particular front seats 110 (e.g., an arm or leg reaching distance) which is occupied by front seat passenger(s) 120, the application 106 may be configured to communicate with the camera(s) 116 and/or the seat back sensors 108 that are disposed on a rear portion of one or more front seats 110. In particular, the application 106 may be configured to communicate with the seat back sensors 108 and/or the camera(s) 116 to determine one or more disturbances that may affect one or more of the front seats 110 of the vehicle 102 that may be caused by the rear seat passenger(s) 122 of the vehicle 102.

Such disturbances may include, but may not be limited to, kicking a rear portion 128 of the front seat(s) 110, shaking of the front seat(s) 110, punching/slapping of a rear portion of the front seat(s) 110, pushing upon the front seat(s) 110, and the like that may be caused by one or more of the rear seat passengers 122 such as children that may be seated within the rear seat(s) 114. In one configuration, upon determining one or more disturbances that may be caused by the rear seat passenger(s) 122 that may be affecting the front seat(s) 110 of the vehicle 102 and may thereby affect the front seat passenger(s) 120 of the vehicle 102, the counteractive alert application 106 may further determine one or more particular regions of the front seat(s) 110 (shown in FIGS. 2A and 2B) that may be affected by the disturbance(s). For example, the application 106 may be configured to determine one or more regions of the front seat(s) 110 that may be contacted and shaken based on a rear seat child passenger kicking the front seat(s) 110.

Upon determining one or more particular regions of the front seat(s) 110 that may be affected by the disturbance, the counteractive alert application 106 may be configured to determine one or more disturbance levels that may be associated with an intensity, a direction, and a force of the vibration, shaking, jolting, and/or pushing that is placed upon of the front seat(s) 110, as sensed by the seat back sensors 108. In one or more embodiments, the counteractive alert application 106 may determine that one or more vibrational elements 124 disposed within one or more of the front seats 110 of the vehicle 102 that are to be actuated at one or more levels to provide a counteracting vibrational force to remove the effects of the disturbance(s) caused by one or more rear seat passenger(s) 122 upon the front seat(s) 110.

The application 106 may thereby send one or more commands to the ECU 104 to control one or more of the vibrational elements 124 at one or more regions of the one or more affected front seats 110 of the vehicle 102 based on the one or more determined regions of the front seat(s) 110 that may be affected by the disturbance(s). In particular, one or more vibrational elements 124 may be actuated to operate at one or more levels (e.g., frequencies, intensities, partially actuated, fully actuated) that may be utilized to counteract the disturbances so that disturbances may not be sensed (e.g., felt) by the front seat passenger(s) 120 seated within the affected front seat(s) 110 of the vehicle 102.

In one or more embodiments, if the counteractive alert application 106 determines that one or more rear seat passengers 122 are seated within the vehicle 102 during operation of the vehicle 102 (during enablement of one or more ignition modes of the vehicle 102), the counteractive alert application 106 may be configured to determine a location of the rear seat passenger(s) 122 with respect to the front seat passenger(s) 120 seated within the respective front seat(s) 110 of the vehicle 102.

As discussed in more detail below, the application 106 may be configured to determine a category of rear seat passenger(s) 122 that is seated within the rear seat(s) 114 of the vehicle 102. In other embodiments, the application 106 may additionally or alternatively be configured to determine a sleeping status of the rear seat passenger(s) 122. In one embodiment, the application 106 may be configured to communicate with the ECU 104 to determine when one or more ignition modes (e.g., accessory mode, battery mode, engine mode) of the vehicle 102 has been disabled by a driver of the vehicle 102 and/or autonomously by the ECU 104 of the vehicle 102.

Upon determining that one or more ignition modes of the vehicle 102 has been disabled, the application 106 may be configured to actuate one or more vibrational elements 124 disposed within one or more regions 202-216 of the front seat(s) 110. In one configuration, one or more vibrational elements 124 may be specifically actuated in one or more manners to provide one or more haptic reminder alerts to remind the front seat passenger(s) 120 that the rear seat passenger(s) 122 are seated within the vehicle 102. For example, the one or more vibrational elements 124 that are disposed within respective portions (left, right, and center) of the front seat(s) 110 may be actuated in one or more intensities and/or frequencies that may be based on the category of the rear seat passenger(s) 122 and/or the sleeping status of the rear seat passenger(s) 122. The one or more vibrational elements 124 may be actuated to indicate to the front seat passenger(s) 120 which rear seat 114 of the vehicle 102 that each rear seat passenger 122 is seated in based on the determined location of the rear seat passenger(s) 122 with respect to the front seat passenger(s) 120 seated within the respective front seat(s) 110 of the vehicle 102.

This functionality may provide haptic reminder alerts in one or more manners that may replicate a disturbance such as kicking caused by the rear seat passenger(s) 122 to alert and remind the front seat passenger(s) 120 that one or more rear seat passengers 122 are seated within one or more particular rear seats 114 of the vehicle 102. As an illustrative example, one or more vibrational elements 124 disposed at a left portion of a driver's side front seat 110 of the vehicle 102 may be actuated to provide repeating haptic reminder alerts. The repeating haptic reminder alerts may be provided at a particular intensity to simulate a rear seat child passenger kicking the rear portion 128 of the driver's side front seat 110 to remind the driver of the rear seat passenger 122 located within the rear seat 114 (within the left rear side of the cabin 118 of the vehicle 102) upon disablement of one or more ignition modes of the vehicle 102.

With particular reference to the components of the vehicle 102, the ECU 104 may include internal processing memory (not shown), an interface circuit (not shown), and bus lines (not shown) for transferring data, sending commands, and communicating with components of the vehicle 102 and the counteractive alert application 106. The ECU 104 may also include a communications device (not shown) for sending data internally in the vehicle 102 and externally to connected devices.

The communication device included within the ECU 104 may be capable of providing wired or wireless computer communications utilizing various protocols to send/receive electronic signals internally to/from components of the vehicle 102. Additionally, the communication device of the ECU 104 may be operably connected for internal computer communication via a bus (e.g., a Controller Area Network (CAN) or a Local Interconnect Network (LIN) protocol bus) to facilitate data input and output between the ECU 104 and the components of the vehicle 102.

The ECU 104 may be operably connected to a storage unit 126 that may store one or more operating systems, applications, associated operating system data, user interfaces, and the like that are executed by the ECU 104. In an exemplary embodiment, the storage unit 126 may store data (e.g., executable data files) that are associated with the counteractive alert application 106 to be executed by the ECU 104.

As discussed, the application 106 may be configured to determine when the rear portion 128 of the respective front seat(s) 110 of the vehicle 102 have been disturbed based on data provided by the seat back sensors 108. Upon determining that one or more portions of the rear portion 128 of the respective front seat(s) 110 of the vehicle 102 have been disturbed, the application 106 may be configured to determine one or more regions (shown in FIG. 2A and FIG. 2B) of the front seat(s) 110 that may be affected by the disturbance(s). As discussed below, the application 106 may be further configured to determine one or more disturbance levels that are associated with one or more respective disturbances that apply to one or more regions of the front seat(s) 110.

With continued reference to FIG. 1, in one embodiment, the storage unit 126 may also include an occupant determination data store 130 that may be accessed by the application 106. The occupant determination data store 130 may specifically be accessed to store a determination of one or more front seats 110 and one or more rear seats 114 of the vehicle 102 that may be occupied or unoccupied by one or more front seat passenger(s) 120 and/or one or more rear seat passenger(s) 122. The determination may be stored each time one or more ignition modes of the vehicle 102 is determined to be enabled, each time the vehicle 102 is put into a drive transmission mode and driven, and/or when the seat weight sensors 112 and/or the camera(s) 116 sense a change in occupancy in one or more of the rear seat(s) 114 (e.g., based on the movement of rear seat passenger(s) 122 from one rear seat 114 or the front seat(s) 110 to another rear seat 114).

As discussed below, the application 106 may be configured to communicate with the ECU 104 to determine when one or more ignition modes of the vehicle 102 are disabled and may access the occupant determination data store 130 to retrieve a latest stored determination of the occupancy of the front seats 110 and the rear seats 114 of the vehicle 102 by one or more front seat passengers 120 and one or more rear seat passenger 122. The latest stored determination may be analyzed by the application 106 to provide one or more haptic reminder alerts to the front seat passenger(s) 120 of the presence of the rear seat passenger(s) 122 seated within the rear seat(s) 114 within the rear portion of the cabin 118.

In one embodiment, the ECU 104 may be operably connected to a head unit 132 that may access the one or more applications and operating systems that are executed by the ECU 104. The head unit 132 may include a display unit 134 that may be positioned to present one or more user interfaces to the front seat passenger(s) 120 seated within the front seat(s) 110 of the vehicle 102. In some configurations, the display unit 134 may include a touch screen display (not shown) that may receive touch based user inputs from the front seat passenger(s) 120 that may apply to the one or more user interfaces that are presented via the display unit 134.

In one or more embodiments, the display unit 134 may be utilized to present one or more user interfaces associated with the counteractive alert application 106 that may allow the front seat passenger(s) 120 to enable or disable the vibrational counteraction to the disturbance(s) caused by the rear seat passenger(s) 122. In another embodiment, the display unit 134 may be utilized to present one or more user interfaces associated with the counteractive alert application 106 that may allow the front seat passenger(s) 120 to stop one or more haptic reminder alerts after they have been initiated to remind the front seat passenger(s) 120 of the presence of the rear seat passenger(s) 122 seated within the rear seat(s) 114. In additional embodiments, the display unit 134 may be utilized to present one or more user interfaces associated with the counteractive alert application 106 that may allow the front seat passenger(s) 120 to actuate movement of the front seat(s) 110 (e.g., in a forward position) to physically move the front seat(s) 110 out of physical range of the rear seat passenger(s) 122 to thereby disallow the rear seat passenger(s) 122 to make contact with the front seat(s) 110.

Figure 2A:
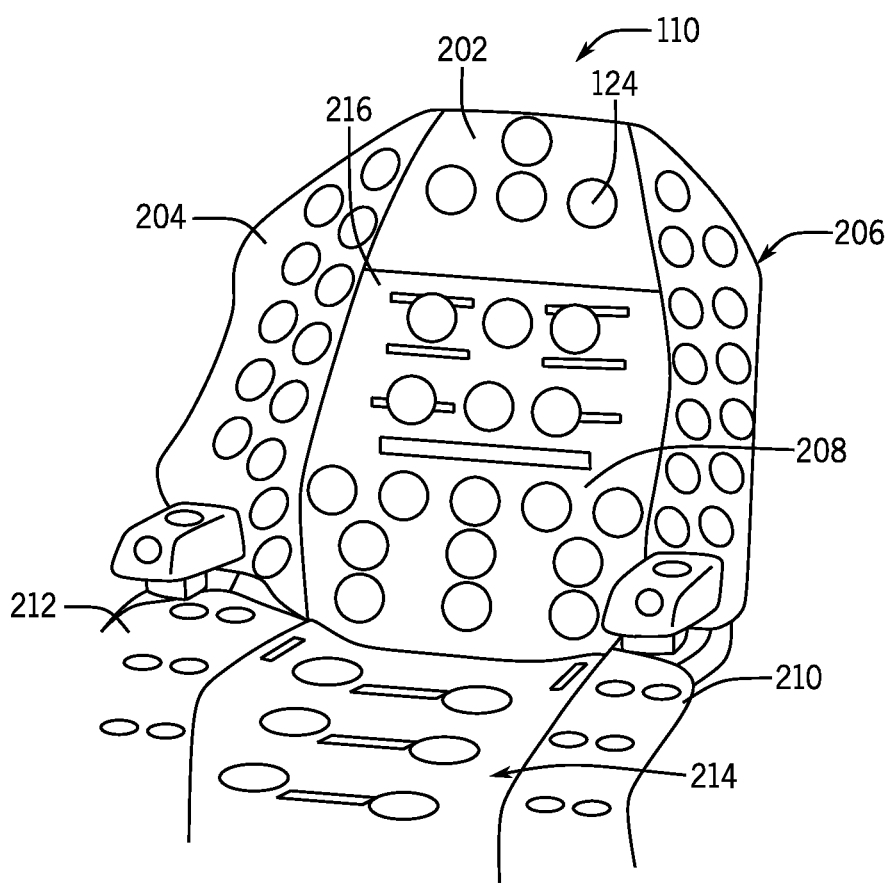
FIG. 2A is an illustrative view of the vibrational elements located within a plurality of regions of one or more front seats of the vehicle according to an exemplary embodiment of the present disclosure.

FIG. 2A is an illustrative view of the vibrational elements 124 located within a plurality of regions 202-216 of one or more of the front seats 110 of the vehicle 102 according to an exemplary embodiment of the present disclosure. In one embodiment, the vibrational elements 124 may include respective motors (not shown) that each include a processing unit (not shown) that is operably connected to send and receive data to/from the ECU 104. As discussed below, in one embodiment, the ECU 104 and/or the counteractive alert application 106 may send commands to one or more of the vibrational elements 124 to be actuated to provide one or more levels of counteractive vibrations at one or more regions 202-216 of the front seat(s) 110 to counteract the disturbance(s) caused by the rear seat passenger(s) 122 with respect to the front seat(s) 110 of the vehicle 102.

Additionally, in another embodiment, the ECU 104 and/or the counteractive alert application 106 may send commands to one or more of the vibrational elements 124 to be actuated to provide one or more haptic reminder alerts to one or more front seat passengers 120 to remind them of the presence of one or more rear seat passengers 122 seated within the rear seat(s) 114 of the vehicle 102.

In one or more configurations, the vibrational elements 124 may include haptic devices that are configured as, but may not be limited to, eccentric rotating mass (ERM) elements, linear resonant actuators elements, air filled elements, liquid filled elements, and the like. In one embodiment, the vibrational elements 124 may be utilized to provide various types of vibrations in various manners, in various intensity levels, and/or at various frequencies of time to provide the counteractive vibrations and/or haptic reminder alerts.

As shown in the illustrative view of FIG. 2A, the vibrational elements 124 may be located (disposed) at one or more regions 202-216 of the front seat(s) 110 that are utilized by the application 106 to provide counteractive vibrations and/or haptic reminder alerts at one or more of the regions 202-216 of the front seat(s) 110. It is contemplated that the application 106 may utilize any number of regions in addition to or in lieu of the regions 202-216 that are provided at one or more portions of each of the front seats 110 of the vehicle 102.

Referring again to FIG. 1, in one embodiment, the ECU 104 may be operably connected to a plurality of vehicle systems 136. The plurality of vehicle systems 136 may include, but may not be limited to, (individual vehicle systems not shown), a vehicle audio system, a vehicle lighting system, a vehicle HVAC system, a vehicle infotainment system, and the like. In some embodiments, the counteractive alert application 106 may be configured to control one or more of the plurality of vehicle systems 136 to be utilized in conjunction with the actuation of one or more of the vibrational elements 124 disposed within one or more of the front seats 110 of the vehicle 102. For example, the counteractive alert application 106 may be configured to control the vehicle lighting system of the plurality of vehicle systems 136 to send one or more signals to one or more lights (not shown) of the vehicle 102 to be enabled when the application 106 actuates one or more vibrational elements 124 to provide the haptic reminder alert(s).

In some embodiments, the vibrational elements 124 may be associated with audio elements (not shown) (e.g., speakers) that may be disposed within and/or around the front seat(s) 110 of the vehicle 102. The counteractive alert application 106 may be configured to control the vehicle audio system of the plurality of vehicle systems 136 to send one or more signals to the audio elements to provide noise-cancelling audio within the vehicle 102. The noise-cancelling audio may be provided to counteract sound associated with the disturbance(s) caused by the rear seat passenger(s) 122 with respect to the rear portion 128 of the front seat(s) 110 that may be provided in conjunction with the actuation of one or more vibrational elements 124 disposed within the front seat(s) 110 of the vehicle 102.

With particular reference to the seat weight sensors 112, the seat weight sensors 112 may be configured as load measurement sensors, capacitive sensors, proximity sensors, and the like and may be disposed on one or more sensor pads (not shown) that may be included within the cushion portion of the front seat(s) 110 and/or the rear seat(s) 114 of the vehicle 102. In some configurations, the seat weight sensors 112 may be disposed within one or more additional portions of the front seat(s) 110 and/or the rear seat(s) 114.

In one embodiment, the seat weight sensors 112 may be configured to sense when a front seat passenger(s) 120 is seated within the respective front seat(s) 110 and/or a rear seat passenger(s) 122 is seated within the respective rear seat(s) 114 of the vehicle 102. In one configuration, the application 106 may be configured to communicate with the seat weight sensors 112 to determine if one or more front seat passengers 120 and/or one or more rear seat passengers 122 are seated within the vehicle 102 at one or more points in time.

In some embodiments, the seat weight sensors may determine a baseline measurement that includes a weight of each of the front seats 110 and each of the rear seats 114 when they are unoccupied. In some instances, the baseline measurement may include a weight of an unoccupied child safety seat that may be placed upon one or more of the rear seats 114. The seat weight sensors 112 may be configured to utilize the baseline measurements to determine a category of front seat passenger(s) 120 and/or a category of rear seat passenger(s) 122 based on the weight of the seated passenger(s) and/or an occupied child safety seat as measured by the seat weight sensors 112.

In one configuration, the seat weight sensors 112 may utilize sensed weight categories to categorize the front seat passenger(s) 120 and/or the rear seat passenger(s) 122 as, but not limited to, an adult passenger, a child passenger, an infant passenger, a pet, and the like. In additional configurations, the seat weight sensors 112 may be configured to determine one or more objects (e.g., bags, boxes, etc.) that may be placed upon one or more of the rear seats 114. The application 106 may be configured to communicate with the seat weight sensors 112 to determine respective categories of the one or more front seat passengers 120 and the one or more rear seat passengers 122 to thereby provide respective haptic reminder alerts.

In one embodiment, the counteractive alert application 106 may be configured to communicate with the camera(s) 116 to determine if one or more front seat passengers 120 and/or one or more rear seat passengers 122 are seated within the vehicle 102 at one or more points in time. The application 106 may additionally be configured to communicate with the camera(s) 116 to determine if a disturbance(s) is caused with respect to the front seat(s) 110 of the vehicle 102 from the rear seat passenger(s) 122 of the vehicle 102.

In one or more embodiments, the one or more of the cameras 116 may be configured to capture one or more images/video of the cabin 118 including the front seat(s) 110 and the rear seat(s) 114 of the vehicle 102 to thereby determine if one or more front seats 110 and one or more rear seats 114 are occupied or unoccupied. In other words, the camera(s) 116 are configured to capture images of front seat passenger(s) 120 and the rear seat passenger(s) 122 as they are seated within the seat(s) 110. In one embodiment, upon the camera(s) 116 capturing one or more images/video, the camera(s) 116 may be configured to execute image logic to determine the presence of the front seat passenger(s) 120 seated within the front seat(s) 110 and/or the rear seat passenger(s) 122 seated within the rear seat(s) 114 of the vehicle 102 at one or more points in time.

In one configuration, upon the camera(s) 116 capturing one or more images/video, the camera(s) 116 may be configured to execute image logic to determine one or more movements of one or more of the rear seat passengers 122 that may indicate that the rear seat passengers 122 are causing a disturbance with respect to the front seat(s) 110 of the vehicle 102. Such movements may include but may not be limited to, kicking and making contact with the rear portion 128 of the front seat(s) 110, shaking of the front seat(s) 110, punching/slapping of the rear portion 128 of the front seat(s) 110, and the like that may be caused by one or more of the rear seat passengers 122 such as children that may be seated within the rear seat(s) 114.

In one embodiment, upon the camera(s) 116 capturing one or more images/video, the camera(s) 116 may be configured to execute image logic to determine a category of the front seat passenger(s) 120 and/or the rear seat passenger(s) 122 of the vehicle 102. In one configuration, the camera(s) 116 may utilize the image logic to categorize the front seat passenger(s) 120 and/or the rear seat passenger(s) 122 as, but not limited to, an adult passenger, a child passenger, an infant passenger, a pet, and the like. In additional configurations, the image logic may be configured to enable the camera(s) 116 to determine one or more objects (e.g., bags, boxes, etc.) that are placed upon one or more of the rear seats 114.

The application 106 may be configured to communicate with the camera(s) 116 to determine respective categories of the one or more front seat passengers 120 and the one or more rear seat passengers 122 to thereby provide respective haptic reminder alerts in a manner (frequency, intensity) that may account for the respective categories of the front seat passenger(s) 120 and/or the rear seat passenger(s) 122.

In another configuration, upon the camera(s) 116 capturing one or more images/video, the camera(s) 116 may be configured to execute image logic to determine if the one or more of the rear seat passengers 122 are not moving one or more portions of their body (e.g., head, torso, arms, arms, legs, and/or feet) for a predetermined period of time that may indicate that the rear seat passenger(s) 122 may be sleeping. The camera(s) 116 may be configured to determine a sleeping status of the rear seat passenger 122 based on the determination of if the one or more of the rear seat passengers 122 are not moving one or more portions of their body for the predetermined period of time. As discussed below, the camera(s) 116 may communicate the sleeping status of the rear seat passenger(s) 122 to the counteractive alert application 106. The application 106 may thereby actuate one or more vibrational elements 124 that may be disposed at one or more regions 202-216 of the front seat(s) 110 at one or more intensity levels, one or more frequency levels, and in one or more manners to provide one or more types of haptic reminder alerts to the front seat passenger(s) 120 of the presence of the rear seat passenger(s) 122 that may be sleeping within the vehicle 102.

Figure 2B:
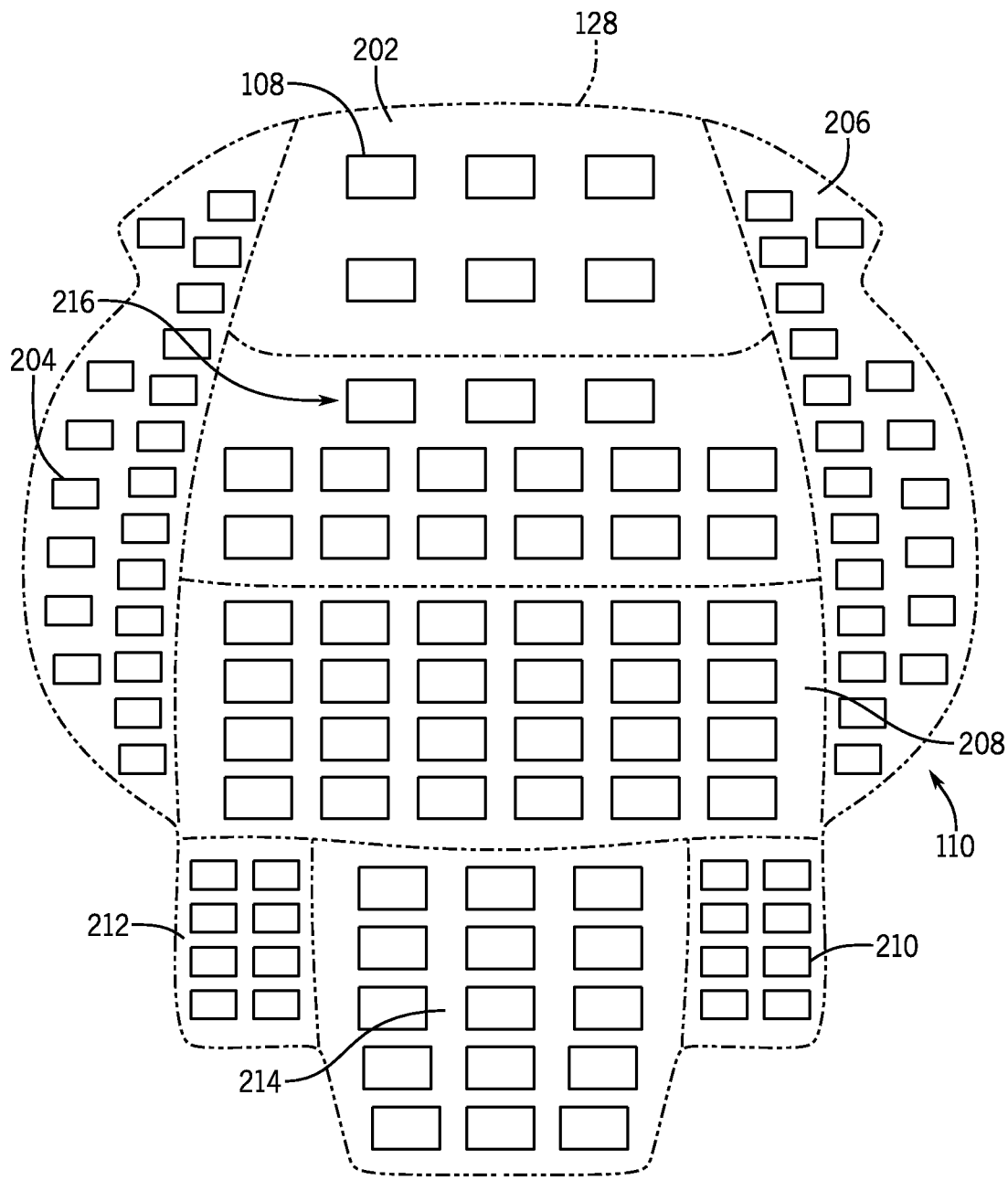
FIG. 2B is an illustrative view of the seat back sensors disposed at a rear portion of one or more of the front seats of the vehicle according to an exemplary embodiment of the present disclosure.

In an exemplary embodiment, the seat back sensors 108 that are disposed on a rear portion 128 of one or more front seats 110 of the vehicle 102 may be configured as pressure sensors, capacitive sensors, load measurement sensors, vibration sensors, intensity sensors, and the like. With reference to FIG. 2B an illustrative view of the seat back sensors 108 disposed at the rear portion 128 of one or more of the front seats 110 of the vehicle 102 according to an exemplary embodiment of the present disclosure, the seat back sensors 108 may be configured to be disposed at one or more regions 202-216 of the rear portion 128 of the front seat(s) 110 of the vehicle 102. As discussed, it is contemplated that the application 106 may utilize any number of regions in addition to or in lieu of the regions 202-216 that are provided at one or more portions of each of the front seats 110 of the vehicle 102.

The regions 202-216 may correspond to the regions 202-216 that include one or more vibrational elements 124 discussed above with respect to FIG. 2A. In one embodiment, the seat back sensors 108 may be configured to sense and measure an intensity, direction, and shear force that is associated with each (physical) disturbance caused by the rear seat passenger(s) 122. For example, the seat back sensors 108 may be configured to sense and measure an intensity, direction, and shear force that is associated with a rear seat passenger child kicking and pushing their feet onto the rear portion 128 of the front seat(s) 110.

In one embodiment, the seat back sensors 108 may be included as part of a sensor communication network (not shown) and may be configured to communicate intensity, direction, and force readings to determine one or more regions 202-216 that may be affected by the disturbance(s). The seat back sensors 108 may be configured to provide respective disturbance sensing data to the counteractive alert application 106. As discussed below, the counteractive alert application 106 may be configured to analyze the disturbance sensing data provided by the seat back sensors 108 to determine counteractive vibrations by one or more of the particular vibrational elements 124 that may be actuated at one or more intensity levels that correspond to one or more determined disturbance levels to provide a counteracting vibrational force to remove (e.g., cancel out) the effects of the disturbance(s) caused by one or more rear seat passenger(s) 122 at one or more affected regions 202-216 of the front seat(s) 110.

II. The Vehicle Haptic Counteractive Alert Application

The counteractive alert application 106 and its functionality will now be described in more detail according to an exemplary embodiment of the present disclosure. In one embodiment, executable data files associated with the counteractive alert application 106 may be stored on the storage unit 126 and executed by the ECU 104 and/or the head unit 132. In additional embodiments, the counteractive alert application 106 may be stored on a memory (not shown) of an external device (not shown) (e.g., remove server) and executed by the ECU 104 and/or the head unit 132 of the vehicle 102 via a computer communication medium (e.g., a remote network connection) between the ECU 104 and the external device.

In one embodiment, the counteractive alert application 106 may include a plurality of modules 138-144 that may include, but may not be limited to, an occupancy determinant module 138, a disturbance determinant module 140, an occupancy reminder determinant module 142, and a vibration execution module 144. It is to be appreciated that the counteractive alert application 106 may include additional modules and/or sub-modules of the plurality of modules 138-144. As discussed below, each of the plurality of modules 138-144 that may complete computing processing functions as the counteractive alert application 106 is operating.

In one embodiment, the counteractive alert application 106 may be automatically enabled to operate upon actuation one or more ignition modes of the vehicle 102. In an additional embodiment, the counteractive alert application 106 may be manually enabled to operate to provide counteracting vibrational force to remove the effects of the disturbance(s) caused by one or more rear seat passenger(s) 122 based on an enablement of the application 106 through the one or more interfaces associated with the application 106 (via the display unit 134 or other input device of the vehicle 102).

In one embodiment, the occupancy determinant module 138 may be configured to communicate with the seat weight sensors 112 disposed within the front seat(s) 110 and the rear seat(s) 114 of the vehicle 102 to receive weight sensor data pertaining to sensed measurements. In one configuration, the seat weight sensors 112 may be configured to provide weight sensor data pertaining to the determination that one or more of the front seats 110 are occupied by respective front seat passengers 120. Additionally, the seat weight sensors 112 may be configured to provide weight sensor data pertaining to the determination that one or more of the rear seats 114 are occupied by respective rear seat passengers 122. In additional configurations, the seat weight sensors 112 may be configured to provide weight sensor data pertaining to the determination that one or more objects (e.g., bags, boxes, etc.) are placed upon one or more of the rear seats 114.

The occupancy determinant module 138 may thereby analyze the weight sensor data and determine that one or more particular front seats 110 are occupied by respective front seat passengers 120 and one or more particular rear seats 114 are occupied by one or more respective rear seat passengers 122. In one embodiment, the occupancy determinant module 138 may communicate data pertaining to the determination of the front seat passenger(s) 120 and/or the rear seat passenger(s) 122 to the disturbance determinant module 140 and the occupancy reminder determinant module 142 of the counteractive alert application 106.

In another embodiment, the occupancy determinant module 138 may be configured to communicate with the camera(s) 116 disposed within the cabin 118 of the vehicle 102 to receive image occupancy data that may pertain to the determination that one or more of the front seats 110 are occupied by respective front seat passengers 120 based on the analysis of image logic by the camera(s) 116. The image occupancy data may also pertain to the determination that one or more of the rear seats 114 are occupied by respective rear seat passengers 122 based on analysis of image logic by the camera(s) 116. In additional configurations, the camera(s) 116 may be configured to provide image occupancy data pertaining to the determination that one or more objects (e.g., bags, boxes, etc.) are placed upon one or more of the rear seats 114.

The occupancy determinant module 138 may thereby analyze the image occupancy data and determine that one or more particular front seats 110 are occupied by respective front seat passengers 120 and one or more particular rear seats 114 are occupied by one or more respective rear seat passengers 122. In one embodiment, the occupancy determinant module 138 may communicate data pertaining to the determination of the front seat passenger(s) 120 and/or the rear seat passenger(s) 122 to the disturbance determinant module 140 and the occupancy reminder determinant module 142 of the counteractive alert application 106.

In an exemplary embodiment, upon determining the existence of one or more rear seat passengers 122 based on the communication by the occupancy determinant module 138, the disturbance determinant module 140 may be configured to receive disturbance sensing data from the seat back sensors 108 disposed at the rear portion 128 of the front seat(s) 110. As discussed above, the disturbance sensing data may pertain to an intensity, direction, and force readings with respect to the disturbance(s) that may affect one or more regions 202-216 of the front seat(s) 110.

In one embodiment, the disturbance determinant module 140 may be configured to analyze the intensity, direction, and force readings with respect to the disturbance(s) that may affect one or more regions 202-216 of the front seat(s) 110. In particular, upon determining the one or more regions 202-216 that may be affected, the disturbance determinant module 140 may determine at least one or more disturbance levels that may be associated with the intensity, the direction, and the force of the vibration, shaking, jolting, and/or pushing that is placed upon one or more respective regions 212-216 of the front seat(s) 110 as sensed by the seat back sensors 108.

In one or more embodiments, the disturbance determinant module 140 may be further configured to determine one or more levels of counteractive vibrations that may be applied at one or more regions 202-216 of the front seat(s) 110 that may correspond to the one or more disturbance levels that may be associated with the intensity, the direction, and the force of the vibration, shaking, jolting, and/or pushing that is placed upon one or more respective regions 212-216 of the front seat(s) 110. The disturbance determinant module 140 may additionally determine one or more vibrational elements 124 that may be disposed at one or more particular regions 202-216 of the front seat(s) 110 that are to be actuated to provide one or more counteractive vibrations.

The one or more counteractive vibrations may thereby be determined to be provided at one or more respective levels at one or more respective regions 202-216 of the front seat(s) 210 to counteract the disturbance(s) caused by the rear seat passenger(s) 122 with respect to one or more regions of the front seat(s) 110 of the vehicle 102. In one configuration, the disturbance determinant module 140 may communicate respective data to the vibration execution module 146 to enable actuation of one or more of the vibrational elements 124 at one or more regions 202-216 of the front seat(s) 110 to provide the one or more counteractive vibrations as determined by the disturbance determinant module 140.

In an exemplary embodiment, upon determining the existence of one or more rear seat passengers 122 based on the communication by the occupancy determinant module 138, the occupancy reminder determinant module 142 may be configured to analyze weight sensor data and/or image occupancy data that are provided by the seat weight sensors 112 and/or the camera(s) 116 to determine one or more particular front seats 110 that are occupied by respective front seat passengers 120. Additionally, the occupancy reminder determinant module 142 may be configured determine if data pertaining to the category of the rear seat passenger(s) 122 and/or the sleeping state of the rear seat passenger(s) 122 has been received.

In one embodiment, upon determining the occupancy of one or more front seats 110 and/or one or more rear seats 114, the occupancy reminder determinant module 142 may be configured to access the occupant determination data store 130 on the storage unit 126 of the vehicle 102. The occupancy reminder determinant module 142 may be configured to store a determination of one or more front seats 110 and one or more rear seats 114 of the vehicle 102 that may be occupied and unoccupied by one or more front seat passenger(s) 120 and one or more rear seat passenger(s) 122 each time one or more ignition modes of the vehicle 102 is enabled, each time the vehicle 102 put into a drive transmission mode and driven, and/or when the seat weight sensors 112 and/or the camera(s) 116 sense a change in occupancy in one or more of the rear seat(s) 114. The occupancy reminder determinant module 142 may also be configured to store the determined category of the rear seat passenger(s) 122 and/or the determined sleeping status of the rear seat passenger(s) 122.

In an exemplary embodiment, the occupancy reminder determinant module 142 may also be configured to communicate with the ECU 104 to determine when the vehicle 102 is disabled based on one or more ignition modes of the vehicle 102 being disabled (e.g., by the driver of the vehicle 102). The occupancy reminder determinant module 142 may access the occupant determination data store 130 to retrieve and analyze a latest stored determination of one or more rear seats 114 of the vehicle 102 that may be occupied and unoccupied by one or more rear seat passenger(s) 122.

The occupancy reminder determinant module 142 may be configured to communicate respective data regarding the occupancy of the front seat(s) 110 and/or the rear seat(s) 114 of the vehicle 102 by one or more front seat passengers 120 and one or more rear seat passengers 122 and may provide additional related data to the vibration execution module 144 to enable actuation of one or more of the vibrational elements 124 to provide one or more haptic reminder alerts to the front seat passenger(s) 120. Accordingly, the front seat passenger(s) 120 may be reminded of the presence of the rear seat passenger(s) 122 seated within the rear seat(s) 114 of the vehicle 102.

In one or more embodiments, the vibration execution module 144 may be configured to evaluate data communicated by the disturbance determinant module 140 and/or the occupancy reminder determinant module 142. In one configuration, based on data communicated by the disturbance determinant module 140, the vibration execution module 144 may thereby communicate with the ECU 104 to actuate one or more vibrational elements 124 that may be disposed at one or more regions 202-216 of the front seat(s) 110 of the vehicle 102.

In particular, the one or more vibrational elements 124 that are disposed at one or more regions 202-216 of the front seat(s) 110 that are affected by the disturbance(s) caused by the rear seat passenger(s) 122 may be actuated to provide one or more counteractive vibrations at one or more respective levels and at one or more respective regions 202-216 of the front seat(s) 210 to counteract the disturbance(s) caused by the rear seat passenger(s) 122. Accordingly, one or more vibrational elements 124 may be actuated at one or more intensity levels that correspond to one or more determined disturbance levels to provide a counteracting vibrational force to remove the effects of the disturbance(s) caused by one or more rear seat passenger(s) 122 at one or more affected regions 202-216 of the front seat(s) 110.

In another configuration, based on data communicated by the occupancy reminder determinant module 142, the vibration execution module 144 may thereby communicate with the ECU 104 to actuate one or more vibrational elements 124 that may be disposed at one or more regions 202-216 of the front seat(s) 110 of the vehicle 102. In particular, the one or more vibrational elements 124 that are disposed at one or more regions 202-216 of the front seat(s) 110 may be actuated to provide one or more types haptic reminder alerts to remind the front seat passenger(s) 120 of the presence of the rear seat passenger(s) 122 seated within the vehicle 102.

The one or more vibrational elements 124 that are disposed within respective portions (left, right, center) of the front seat(s) 110 may be actuated in one or more manners to indicate to the front seat passenger(s) 120 which rear seat 114 of the vehicle 102 is occupied by the rear seat passenger(s) 122 based on a determined location of the rear seat passenger(s) 122 with respect to the front seat passenger(s) 120 seated within the respective front seat(s) 110 of the vehicle 102. The one or more vibrational elements 124 may also be actuated in one or more manners based on the category of the rear seat passenger(s) 122 and/or the sleeping status of the rear seat passenger(s) 122. This functionality may provide haptic reminder alerts in one or more manners that may replicate a disturbance such as kicking of a particular intensity level that may be caused by the rear seat passenger(s) 122 to alert and remind the front seat passenger(s) 120 that one or more rear seat passengers 122 are seated within one or more particular rear seats 114 of the vehicle 102.

Figure 3:
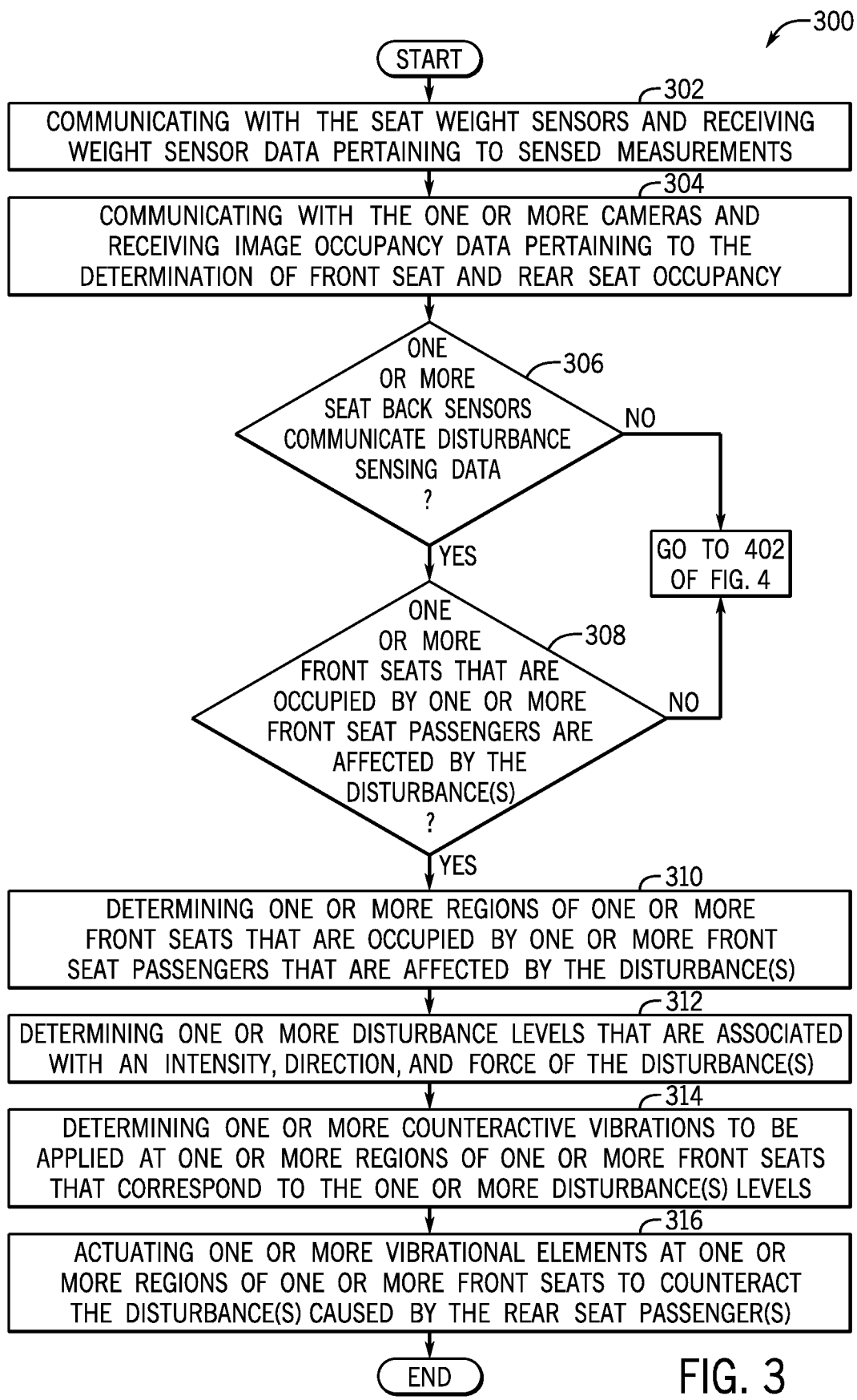
FIG. 3 is a process flow diagram of a method for counteracting one or more disturbances affecting one or more front seats of the vehicle according to an exemplary embodiment of the present disclosure.

III. Exemplary Methods Executed by the Vehicle Haptic Counteractive Alert Application FIG. 3 is a process flow diagram of a method 300 for counteracting one or more disturbances affecting one or more front seats 110 of the vehicle 102 according to an exemplary embodiment of the present disclosure. FIG. 3 will be described with reference to the components of FIG. 1, FIG. 2A and FIG. 2B, though it is to be appreciated that the method 300 of FIG. 3 may be used with other systems/components. The method 300 may begin at block 302, wherein the method 300 may include communicating with the seat weight sensors 112 and receiving weight sensor data pertaining to sensed measurements.

In an exemplary embodiment, the occupancy determinant module 138 may be configured to communicate with the seat weight sensors 112 disposed within the front seat(s) 110 and the rear seat(s) 114 of the vehicle 102 to receive weight sensor data pertaining to sensed measurements. In one configuration, the seat weight sensors 112 may be configured to provide weight sensor data pertaining to the determination that one or more of the front seats 110 are occupied by respective front seat passengers 120. Additionally, the seat weight sensors 112 may be configured to provide weight sensor data pertaining to the determination that one or more of the rear seats 114 are occupied by respective rear seat passengers 122. In additional configurations, the seat weight sensors 112 may be configured to provide weight sensor data pertaining to the determination that one or more objects (e.g., bags, boxes, etc.) are placed upon one or more of the rear seats 114.

Upon receiving the weight sensor data pertaining to sensed measurements, the occupancy determinant module 138 may analyze the weight sensor data to determine that one or more particular front seats 110 are occupied by respective front seat passengers 120 and one or more particular rear seats 114 are occupied by one or more respective rear seat passengers 122. As discussed, the occupancy determinant module 138 may communicate data pertaining to the determination of the front seat passenger(s) 120 and/or the rear seat passenger(s) 122 to the disturbance determinant module 140.

The method 300 may proceed to block 304, wherein the method 300 may include communicating with the one or more cameras 116 and receiving image occupancy data pertaining to the determination of front seat and rear seat occupancy. In an exemplary embodiment, the occupancy determinant module 138 may be configured to communicate with the camera(s) 116 disposed within the cabin 118 of the vehicle 102 to receive image occupancy data that may pertain to the determination of occupancy of one or more of the front seats 110 based on the analysis of image logic by the camera(s) 116. The image occupancy data may also pertain to the determination of occupancy of one or more of the rear seats 114 based on analysis of image logic by the camera(s) 116. In additional configurations, the camera(s) 116 may be configured to provide image occupancy data pertaining to the determination that one or more objects (e.g., bags, boxes, etc.) are placed upon one or more of the rear seats 114.

In one embodiment, the occupancy determinant module 138 may analyze the image occupancy data and determine that one or more particular front seats 110 are occupied by respective front seat passengers 120 and one or more particular rear seats 114 are occupied by one or more respective rear seat passengers 122. In one embodiment, the occupancy determinant module 138 may communicate data pertaining to the determination of the front seat passenger(s) 120 and/or the rear seat passenger(s) 122 to the disturbance determinant module 140.

The method 300 may proceed to block 306, wherein the method 300 may include determining if one or more seat back sensors 108 communicate disturbance sensing data. In one embodiment, the seat back sensors 108 that are disposed on a rear portion 128 of one or more front seats 110 may be configured to communicate disturbance sensing data when the rear portion 128 of the respective front seat(s) 110 of the vehicle 102 have been disturbed by the rear seat passenger(s) 122.

If it is determined that the one or more seat back sensors 108 do not communicate disturbance sensing data based on not sensing any disturbance(s) to the front seat(s) 110 (at block 306), the counteractive alert application 106 may be configured to execute the method 400 discussed below with respect FIG. 4 to thereby provide one or more haptic reminder alerts when applicable to the front seat passenger(s) 120 regarding the presence of one or more rear seat passengers 122 seated within the rear seat(s) 114 of the vehicle 102.

If it is determined that the one or more seat back sensors 108 communicate disturbance sensing data based on sensing disturbance(s) to the front seat(s) 110 (at block 306), the method 300 may proceed to block 308, wherein the method 300 may include determining if one or more front seats 110 that are occupied by one or more front seat passengers 120 are affected by the disturbance(s). In one embodiment, upon determining that one or more front seats 110 have been affected by the disturbance(s) caused by the rear seat passenger(s) 122, the disturbance determinant module 140 may be configured to evaluate data communicated by the occupancy determinant module 138 to determine if any of the front seats 110 that are affected by the disturbance are occupied by front seat passengers 120.

The disturbance determinant module 140 may thereby evaluate the data provided by the seat back sensors 108 to determine if particular front seats 110 that have determined to be occupied by the occupancy determinant module 138 (at blocks 302 and 304), are affected by the disturbance(s) as sensed by the seat back sensors 108. Stated differently, the disturbance determinant module 140 may be configured to determine if one or more front seat passengers 120 are seated within one or more front seats 110 that may be affected by the disturbance(s) caused by the rear seat passenger(s) 122.

If it is not determined that one or more front seats 110 that are occupied by one or more front seat passengers 120 are affected by the disturbance(s) (at block 308), the counteractive alert application 106 may be configured to execute the method 400 discussed below with respect FIG. 4 to thereby provide a haptic reminder alert(s) if applicable to the front seat passenger(s) 120 regarding the presence of one or more rear seat passengers 122 seated within the rear seat(s) 114 of the vehicle 102.

If it is determined that one or more front seats 110 that are occupied by one or more front seat passenger(s) 120 are affected by the disturbance(s) (at block 308), the method 300 may proceed to block 310, wherein the method 300 may include determining one or more regions 202-216 of one or more front seats 110 that are occupied by one or more front seat passengers 120 that are affected by the disturbance(s). In an exemplary embodiment, upon determining that one or more portions of the rear portion 128 of the respective front seat(s) 110 of the vehicle 102 have been disturbed, the disturbance determinant module 140 may be configured to communicate further with the seat back sensors 108 and determine one or more regions 202-216 of the front seat(s) 110 that may be affected by the disturbance(s). In particular, the disturbance determinant module 140 may be configured to analyze the intensity, direction, and force readings of the disturbance(s) sensed at each of the regions 202-216 of the front seat(s) 110 to determine one or more regions 202-216 of the front seat(s) 110 that may be affected by the disturbance(s).

The method 300 may proceed to block 312, wherein the method 300 may include determining one or more disturbance levels that are associated with an intensity, direction, and force of the disturbance(s). In one embodiment, upon determining the one or more regions 202-216 of the front seat(s) 110 that are occupied and may be affected by the disturbance(s), the disturbance determinant module 140 may determine at least one or more disturbance levels that may be associated with the intensity, the direction, and the force of the vibration, shaking, jolting, and/or pushing that is placed upon one or more respective regions 212-216 of the front seat(s) 110 as sensed by the seat back sensors 108.

The method 300 may proceed to block 314, wherein the method 300 may include determining one or more counteractive vibrations to be applied at one or more regions 202-216 of one or more front seats 110 that correspond to the one or more disturbance levels. In one or more embodiments, upon determining the one or more disturbance levels that may be associated with the intensity, the direction, and the force of the vibration, shaking, jolting, and/or pushing that is placed upon one or more respective regions 212-216 of the front seat(s) 110, the disturbance determinant module may be further configured to determine one or more levels of counteractive vibrations that may be applied at one or more regions 202-216 of the front seat(s) 110 that may correspond to the one or more disturbance levels.

The one or more determined levels of counteractive vibrations that may be applied may be determined to counteract the intensity, the direction, and the force of the vibration, shaking, jolting, and/or pushing that is placed upon one or more respective regions 212-216 of the front seat(s) 110 as sensed by the seat back sensors 108. The disturbance determinant module 140 may additionally determine one or more vibrational elements 124 that may be actuated to provide one or more counteractive vibrations at one or more respective levels that correspond to the one or more disturbance levels and at one or more respective regions 202-216 of the front seat(s) 210 to counteract the disturbance(s) caused by the rear seat passenger(s) 122.

The method 300 may proceed to block 316, wherein the method 300 may include actuating one or more vibrational elements 124 at one or more regions 202-216 of one or more front seats 110 to counteract the disturbance(s) caused by the rear seat passenger(s) 122. In one configuration, the disturbance determinant module 140 may communicate data pertaining to more vibrational elements 124 that may be actuated to provide one or more counteractive vibrations at one or more respective levels that correspond to the determined disturbance levels to the vibration execution module 146 to enable actuation of one or more of the one or more vibrational elements 124 at one or more regions of the front seat(s) 110.

In one embodiment, based on data communicated by the disturbance determinant module 140, the vibration execution module 144 may thereby communicate with the ECU 104 to actuate one or more vibrational elements 124 that may be disposed at one or more regions 202-216 of the front seat(s) 110 of the vehicle 102. In particular, the one or more vibrational elements 124 that are disposed at one or more regions 202-216 of the front seat(s) 110 that are occupied and are affected by the disturbance(s) caused by the rear seat passenger(s) 122 may be actuated to provide one or more counteractive vibrations at one or more respective levels at one or more respective regions 202-216 of the front seat(s) 110 to counteract the disturbance(s) caused by the rear seat passenger(s) 122.

Accordingly, one or more counteractive vibrations may be provided by one or more of the particular vibrational elements 124 that may be actuated at one or more intensity levels that correspond to the one or more disturbance levels to provide a counteracting vibrational force to remove the effects of the disturbance(s) caused by one or more rear seat passenger(s) 122 at one or more affected regions 202-216 of the front seat(s) 110. Consequently, the front seat passenger(s) 120 seated within respective front seat(s) 110 that may be affected by the disturbance(s) may not sense the disturbance(s) caused by the rear seat passenger(s) 122.

Figure 4:
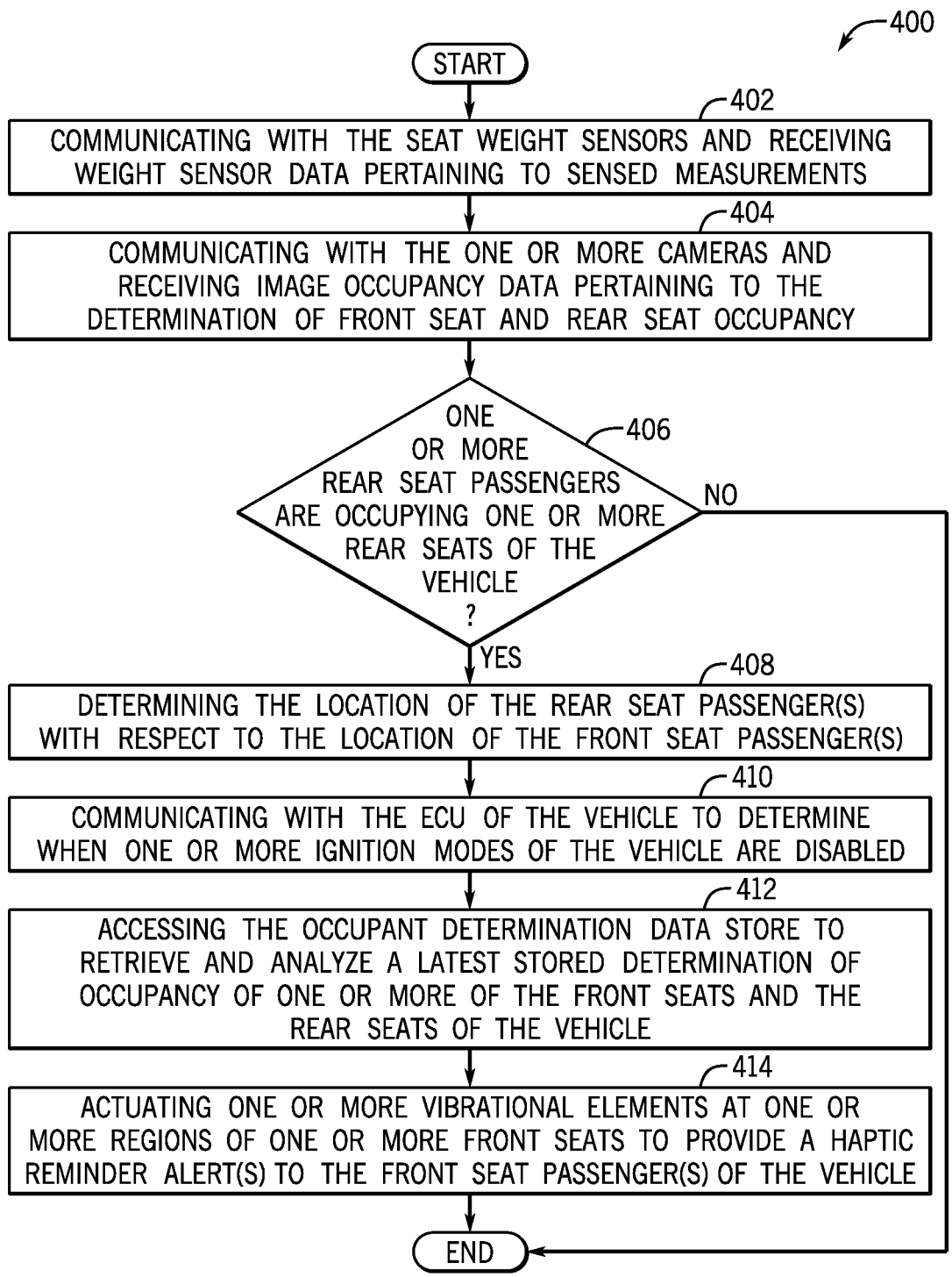
FIG. 4 is a process flow diagram of a method for providing one or more haptic reminder alerts to one or more front seat passengers regarding the presence of one or more rear seat passengers seated within one or more of the rear seats of the vehicle according to an exemplary embodiment of the present disclosure.

FIG. 4 is a process flow diagram of a method 400 for providing one or more haptic reminder alerts to one or more front seat passengers 120 regarding the presence of one or more rear seat passengers 122 seated within one or more of the rear seats 114 of the vehicle 102 according to an exemplary embodiment of the present disclosure. FIG. 4 will be described with reference to the components of FIG. 1, FIG. 2A and FIG. 2B, though it is to be appreciated that the method 400 of FIG. 4 may be used with other systems/components. The method 400 may begin at block 402, wherein the method 400 may include communicating with the seat weight sensors 112 and receiving weight sensor data pertaining to sensed measurements.

In an exemplary embodiment, the occupancy determinant module 138 may be configured to communicate with the seat weight sensors 112 disposed within the front seat(s) 110 and the rear seat(s) 114 of the vehicle 102 to receive weight sensor data pertaining to sensed measurements. In one configuration, the seat weight sensors 112 may be configured to provide weight sensor data pertaining to the determination that one or more of the front seats 110 are occupied by respective front seat passengers 120. Additionally, the seat weight sensors 112 may be configured to provide weight sensor data pertaining to the determination that one or more of the rear seats 114 are occupied by respective rear seat passengers 122. In additional configurations, the seat weight sensors 112 may be configured to provide weight sensor data pertaining to the determination that one or more objects (e.g., bags, boxes, etc.) are placed upon one or more of the rear seats 114.

As discussed above, the seat weight sensors 112 may determine a baseline measurement that includes the weight of each of the front seats 110 and each of the rear seats 114 when they are unoccupied. In some instances, the baseline measurement that includes the weight of each of the rear seats 114 when an unoccupied child safety seat may be placed upon one or more of the rear seats 114. The seat weight sensors 112 may be configured to utilize the baseline measurements to determine the category of front seat passenger(s) 120 and/or the category of rear seat passenger(s) 122 based on sensed weight categories that are based on the weight of the seated rear seat passenger(s) 122.

As discussed above, the seat weight sensors 112 may additionally or alternatively utilize sensed weight categories to categorize the front seat passenger(s) 120 and/or the rear seat passenger(s) 122 as, but not limited to, an adult passenger, a child passenger, an infant passenger, a pet, and the like. Upon receiving the weight sensor data pertaining to sensed measurements, the occupancy determinant module 138 may analyze the weight sensor data determine that one or more particular front seats 110 are occupied by respective front seat passengers 120 and one or more particular rear seats 114 are occupied by one or more respective rear seat passengers 122. The occupancy determinant module 138 may also be configured to analyze the weight sensor data to determine respective categories of the one or more front seat passengers 120 and the one or more rear seat passengers 122 and may communicate such data to the occupancy reminder determinant module 142. The occupancy determinant module 138 may communicate data pertaining to the determination of the front seat passenger(s) 120 and/or the rear seat passenger(s) 122 and the category of the front seat passenger(s) 120 and the rear seat passenger(s) 122 to the disturbance determinant module 140.

The method 400 may proceed to block 404, wherein the method 400 may include communicating with the one or more cameras 116 and receiving image occupancy data pertaining to the determination of front seat and rear seat occupancy. In an exemplary embodiment, the occupancy determinant module 138 may be configured to communicate with the camera(s) 116 disposed within the cabin 118 of the vehicle 102 to receive image occupancy data that may pertain to the determination that one or more of the front seats 110 are occupied by respective front seat passengers 120 based on the analysis of image logic by the camera(s) 116. The image occupancy data may also pertain to the determination that one or more of the rear seats 114 are occupied by respective rear seat passengers 122 based on analysis of image logic by the camera(s) 116. In additional configurations, the camera(s) 116 may be configured to provide image occupancy data pertaining to the determination that one or more objects (e.g., bags, boxes, etc.) are placed upon one or more of the rear seats 114.

In one embodiment, the image occupancy data may additionally include respective categories of the front seat passenger(s) 120 and/or the rear seat passenger(s) 122 based on the execution of image logic. As discussed above, the camera(s) 116 may utilize the image logic to categorize the front seat passenger(s) 120 and/or the rear seat passenger(s) 122 as, but not limited to, an adult passenger, a child passenger, an infant passenger, a pet, and the like. In additional configurations, the image logic may be configured to enable the camera(s) 116 to determine one or more objects (e.g., bags, boxes, etc.) that are placed upon one or more of the rear seats 114.

In another configuration, the image occupancy data may include the determined sleeping status of the rear seat passenger(s) 122 that is based upon the execution of image logic. As discussed above, the camera(s) 116 may execute the image logic to determine if the one or more of the rear seat passengers 122 are not moving one or more portions of their body (e.g., head, torso, arms, arms, legs, and/or feet) for a predetermined period of time that may indicate that the rear seat passenger(s) 122 may be sleeping. This analysis may be utilized to determine a sleeping status of the rear seat passenger 122 and such data may be included within the image occupancy data that is communicated to the occupancy determinant module 138.

In one embodiment, the occupancy determinant module 138 may analyze the image occupancy data and may determine that one or more particular front seats 110 are occupied by respective front seat passengers 120 and one or more particular rear seats 114 are occupied by one or more respective rear seat passengers 122. The occupancy determinant module 138 may additionally determine the category of one or more rear seat passengers 122 and/or the sleeping status of the one or more rear seat passengers 122 based on the analysis of the image occupancy data. In one embodiment, the occupancy determinant module 138 may communicate data pertaining to the determination of the front seat passenger(s) 120 and/or the rear seat passenger(s) 122, the category of the rear seat passenger(s) 122, and/or the sleeping status of the rear seat passenger(s) 122 to the disturbance determinant module 140.

The method 400 may proceed to block 406, wherein the method 400 may include determining if one or more rear seat passengers 122 are occupying one or more rear seats 114 of the vehicle 102. In one embodiment, the occupancy reminder determinant module 142 may be configured to analyze the data communicated by the occupancy determinant module 138 to determine if one or more rear seat passengers 122 are seated within one or more respective rear seats 114 of the vehicle 102. In some embodiments, this determination may take place, each time the vehicle 102 put into a drive transmission mode and driven and/or when the seat weight sensors 112 and/or the camera(s) 116 sense a change in occupancy in one or more of the rear seat(s) 114 (e.g., based on the movement of rear seat passenger(s) 122 from one rear seat 114 or the front seat(s) 110 to another rear seat 114).

If it is determined that one or more rear seat passengers 122 are occupying one or more rear seats 114 of the vehicle 102 (at block 406), the method 400 may proceed to block 408, wherein the method 400 may include determining the location of the rear seat passenger(s) 122 with respect to the location of the front seat passenger(s) 120. In an exemplary embodiment, the occupancy reminder determinant module 142 may be configured to analyze data communicated by the occupancy determinant module 138 to determine the location of the rear seat passenger(s) 122 with respect to the location of the front seat passenger(s) 120 seated within the respective front seat(s) 110 of the vehicle 102. In particular, the occupancy reminder determinant module 142 may determine each location of each rear seat(s) 114 that is occupied by the rear seat passenger(s) 122 in comparison to each front seat(s) 110 that is occupied by the front seat passenger(s) 120. Accordingly, the location of each rear seat passenger(s) 122 may be determined from the perspective of each front seat passenger(s) 120.

In one embodiment, upon determining the location of the rear seat passenger(s) 122 with respect to the location of the front seat passenger(s) 120, the occupancy reminder determinant module 142 may be configured to access the occupant determination data store 130 on the storage unit 126 of the vehicle 102. The occupancy reminder determinant module 142 may be configured to store a determination of one or more front seats 110 and one or more rear seats 114 of the vehicle 102 that may be occupied and unoccupied by one or more front seat passenger(s) 120 and one or more rear seat passenger(s) 122 each time one or more ignition modes of the vehicle 102 is enabled, each time the vehicle 102 put into a drive transmission mode and driven, and/or when the seat weight sensors 112 and/or the camera(s) 116 sense a change in occupancy in one or more of the rear seat(s) 114. In some configurations, the occupancy reminder determinant module 142 may also be configured store the category of the rear seat passenger(s) 122, and/or the sleeping status of the rear seat passenger(s) 122 on the occupant determination data store 130.

The method 400 may proceed to block 410, wherein the method 400 may include communicating with the ECU 104 of the vehicle 102 to determine when one or more ignition modes of the vehicle 102 are disabled. In an exemplary embodiment, upon storing the determination of occupancy on the occupant determination data store 130, the occupancy reminder determinant module 142 may be configured to communicate with the ECU 104 to determine when the vehicle 102 is disabled based on one or more ignition modes of the vehicle 102 being disabled (e.g., by the driver of the vehicle 102).

The method 400 may proceed to block 412, wherein the method 400 may include accessing the occupant determination data store 130 to retrieve and analyze a latest stored determination of occupancy of one or more of the front seats 110 and the rear seats 114 of the vehicle 102. In one or more embodiments, the occupancy reminder determinant module 142 may access the occupant determination data store 130 to retrieve and analyze a latest stored determination of one or more front seats 110 and one or more rear seats 114 of the vehicle 102 that may be occupied by one or more front seat passengers 120 and one or more rear seat passenger(s) 122. The occupancy reminder determinant module 142 may additionally retrieve and analyze a latest stored determination of the category of the rear seat passenger(s) 122 and/or the sleeping status of the rear seat passenger(s) 122 as previously stored on the occupant determination data store 130.

The method 400 may proceed to block 414, wherein the method 400 may include actuating one or more vibrational elements 124 at one or more regions 202-216 of one or more of the front seats 110 to provide a haptic reminder alert(s) to the front seat passenger(s) 120 of the vehicle 102. In an exemplary embodiment, the occupancy reminder determinant module 142 may be configured to communicate respective data regarding the occupancy of the front seat(s) 110 and/or the rear seat(s) 114 of the vehicle 102 by one or more front seat passengers 120 and one or more rear seat passengers 122 and may provide additional data pertaining to the category of the rear seat passenger(s) 122 and/or the sleeping status of the rear seat passenger(s) 122 to the vibration execution module 144. This data may be used to enable actuation of one or more of the one or more vibrational elements 124 to provide one or more haptic reminder alerts to the front seat passenger(s) 120 as a reminder of the presence of the rear seat passenger(s) 122 seated within the rear seat(s) 114 within the rear portion of the cabin 118.

In one embodiment, based on the evaluation of the data communicated by the occupancy reminder determinant module 142, the vibration execution module 144 may thereby communicate with the ECU 104 to actuate one or more vibrational elements 124 that may be disposed at one or more regions 202-216 of the front seat(s) 110 of the vehicle 102. In particular, the one or more vibrational elements 124 that are disposed at one or more regions 202-216 of the front seat(s) 110 may be actuated to provide one or more types of reminder alerts to remind the front seat passenger(s) 120 of the presence of the rear seat passenger(s) 122 seated within the vehicle 102.

More specifically, the one or more vibrational elements 124 that are disposed within respective portions (left, right, center) of the front seat(s) 110 may be actuated in one or more manners to indicate to the front seat passenger(s) 120 which rear seat 114 of the vehicle 102 that each rear seat passenger 122 is seated based on the determined location of the rear seat passenger(s) 122 with respect to the front seat passenger(s) 120, the category of the rear seat passenger(s) 122, and/or the sleeping status of the rear seat passenger(s) 122.

This functionality may provide haptic alerts in one or more manners that may replicate a disturbance such as a replicated kicking of the rear portion 128 of the front seat(s) at a particular intensity level to alert and remind the front seat passenger(s) 120 that one or more rear seat passengers 122 are seated within one or more particular rear seats 114 of the vehicle 102. For example, with respect to FIG. 2A, one or more vibrational elements 124 disposed at a region 216 of a driver's side front seat 110 of the vehicle 102 may be actuated to provide repeating haptic reminder alerts that may simulate a rear seat child passenger kicking the rear portion 128 of the driver's side front seat 110 to remind the driver of the rear seat passenger 122 located within the rear seat 114 located within a left rear side of the cabin 118 of the vehicle 102 upon disablement of one or more ignition modes of the vehicle 102.

The vibration execution module 144 may additionally provide one or more haptic reminder alerts at one or more regions 202-216 of the front passenger seat(s) 110 at one or more intensities and/or one or more frequencies that may be based on the category of the rear seat passenger(s) 122 and/or the sleeping status of the rear seat passenger(s) 122. For example, if the rear seat passenger 122 is located at a right rear portion of the vehicle 102 with respect to the driver of the vehicle 102 is categorized as a child and is determined to be sleeping, the vibration execution module 144 may provide one or more haptic reminder alerts at the region 204 in a manner that is highly intense (e.g., simulates a higher kicking force) and in a high frequency (e.g., every 15 seconds) to ensure that the driver of the vehicle 102 is alerted with respect to the presence of the rear seat passenger 122.

In one embodiment, upon providing the one or more haptic reminder alerts, the vibration execution module 144 may communicate with the occupancy determinant module 138 to determine if one or more rear seat passenger(s) 122 are no longer seated within the vehicle 102 (e.g., rear seat passenger child exits the vehicle 102). The vibration execution module 144 may be configured to provide one or more haptic reminder alerts at one or more regions 202-216 of the front passenger seat(s) 110 until it is determined that the one or more rear seat passenger(s) 122 are no longer seated within the vehicle 102. In an exemplary embodiment, the counteractive alert application 106 may communicate with the ECU 104 to determine when one or more ignition modes of the vehicle 102 are enabled to thereby re-execute the method 300 and the method 400 to actuate one or more vibrational elements 124 to counteract one or more disturbances affecting one or more front seats 110 of the vehicle 102 and to provide one or more haptic reminder alerts to one or more front seat passengers 120 when one or more ignition modes of the vehicle 102 are determined to be disabled.

Figure 5:
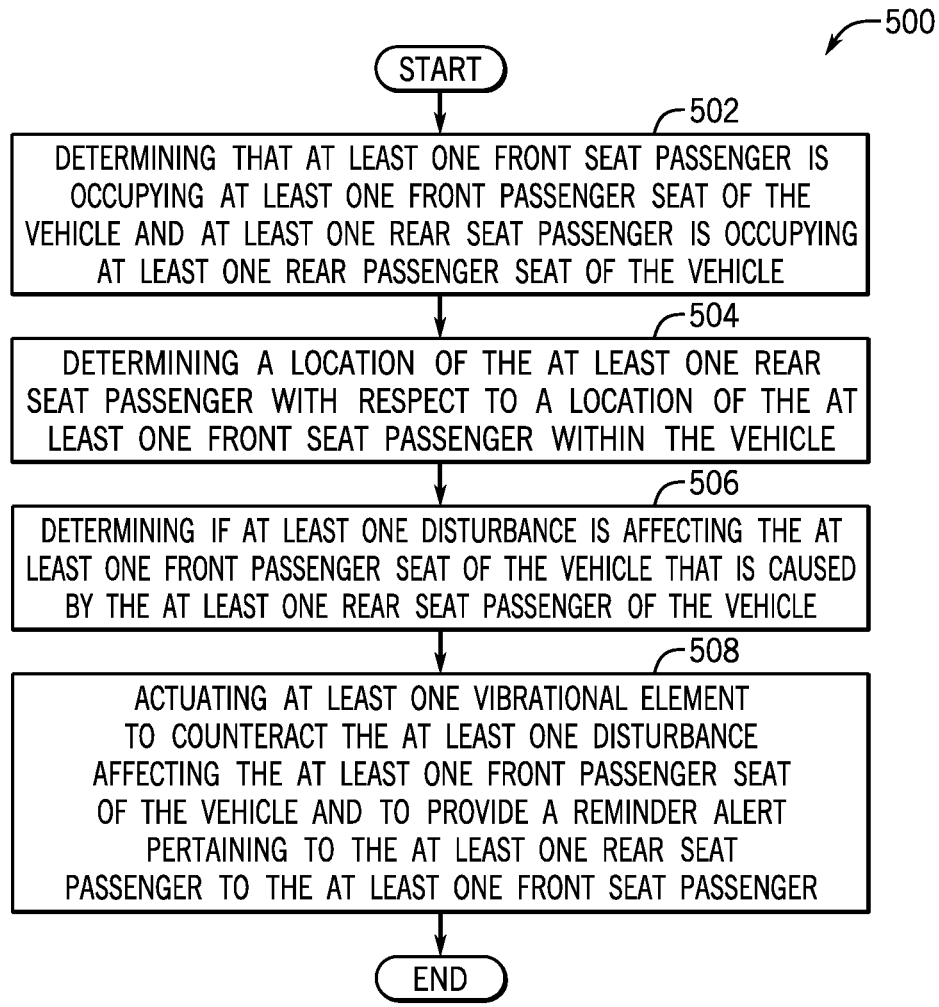
FIG. 5 is a process flow diagram of a method for providing haptic counteractions and alerts within a seat of a vehicle according to an exemplary embodiment of the present disclosure.

FIG. 5 is a process flow diagram of a method 500 for providing haptic counteractions and alerts within a seat of a vehicle 102 according to an exemplary embodiment of the present disclosure. FIG. 5 will be described with reference to the components of FIG. 1, FIG. 2A and FIG. 2B, though it is to be appreciated that the method 500 of FIG. 5 may be used with other systems/components. The method 500 may begin at block 502, wherein the method 500 may include determining that at least one front seat passenger 120 is occupying at least one front passenger seat 110 of the vehicle 102 and at least one rear seat passenger 122 is occupying at least one rear passenger seat 114 of the vehicle 102.

The method 500 may proceed to block 504, wherein the method 500 may include determining a location of the at least one rear seat passenger 122 with respect to a location of the at least one front seat passenger 120 within the vehicle 102. The method 500 may proceed to block 506, wherein the method 500 may include determining if at least one disturbance is affecting the at least one front passenger seat 110 of the vehicle 102 that is caused by the at least one rear seat passenger 122 of the vehicle 102.

The method 500 may proceed to block 508, wherein the method 500 may include actuating at least one vibrational element 124 to counteract the at least one disturbance affecting the at least one front passenger seat 110 of the vehicle 102 and to provide a reminder alert pertaining to the at least one rear seat passenger 122 to the at least one front seat passenger 120 when the vehicle 102 is determined to be disabled.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing haptic counteractions and alerts within a seat of a vehicle, comprising:
    determining that at least one front seat passenger is occupying at least one front passenger seat of the vehicle and at least one rear seat passenger is occupying at least one rear passenger seat of the vehicle;
    determining a location of the at least one rear seat passenger with respect to a location of the at least one front seat passenger within the vehicle;
    determining if at least one disturbance is affecting the at least one front passenger seat of the vehicle that is caused by the at least one rear seat passenger of the vehicle; and
    actuating at least one vibrational element to counteract the at least one disturbance affecting the at least one front passenger seat of the vehicle and to provide a reminder alert pertaining to the at least one rear seat passenger to the at least one front seat passenger.

2. The computer-implemented method of claim 1, wherein determining the location of the at least one rear seat passenger with respect to the location of the at least one front seat passenger includes analyzing data provided by seat weight sensors to determine the location of the at least one front seat passenger of the vehicle and the location of the at least one rear seat passenger of the vehicle.

3. The computer-implemented method of claim 2, further including analyzing data provided by the seat weight sensors and storing a category of the at least one rear seat passenger of the vehicle, wherein the category of the at least one rear seat passenger includes at least one of: an adult, a child, and an infant.

4. The computer-implemented method of claim 3, further including storing the location of the at least one front seat passenger of the vehicle, the location of the at least one rear seat passenger of the vehicle, and the category of the at least one rear seat passenger onto an occupant determination data store each time at least one ignition mode of the vehicle is enabled.

5. The computer-implemented method of claim 4, wherein determining the location of the at least one rear seat passenger with respect to the location of the at least one front seat passenger includes determining that at least one ignition mode of the vehicle is disabled and accessing the occupant determination data store to retrieve a latest stored determination of occupancy of the at least one front passenger seat, a latest stored determination of occupancy of the at least one rear passenger seat, and a latest stored determination of the category of the at least one rear seat passenger.

6. The computer-implemented method of claim 5, wherein actuating the at least one vibrational element includes actuating the at least one vibrational element disposed at a region of the at least one front passenger seat at a particular intensity level and frequency based on the latest stored determination of occupancy of the at least one front passenger seat, the latest stored determination of occupancy of the at least one rear passenger seat, and the latest stored determination of the category of the at least one rear seat passenger.

7. The computer-implemented method of claim 1, wherein determining if the at least one disturbance is affecting the at least one front passenger seat of the vehicle includes receiving data from seat back sensors disposed at a rear portion of the at least one front passenger seat and determining a region of the at least one front passenger seat that is affected by the at least one disturbance.

8. The computer-implemented method of claim 7, wherein determining if the at least one disturbance is affecting the at least one front passenger seat of the vehicle includes determining at least one disturbance level that is associated with an intensity, a direction, and a force of the at least disturbance that is placed upon the region of the at least one front passenger seat.

9. The computer-implemented method of claim 8, wherein actuating the at least one vibrational element includes actuating the at least one vibrational element to provide at least one counteractive vibration at the region of the at least one front passenger seat that is affected by the at least one disturbance at a level that corresponds to the at least one disturbance level.

10. A system for providing haptic counteractions and alerts within a seat of a vehicle, comprising:
a memory storing instructions when executed by a processor cause the processor to:
determine that at least one front seat passenger is occupying at least one front passenger seat of the vehicle and at least one rear seat passenger is occupying at least one rear passenger seat of the vehicle;
determine a location of the at least one rear seat passenger with respect to a location of the at least one front seat passenger within the vehicle;
determine if at least one disturbance is affecting the at least one front passenger seat of the vehicle that is caused by the at least one rear seat passenger of the vehicle; and
actuate at least one vibrational element to counteract the at least one disturbance affecting the at least one front passenger seat of the vehicle and to provide a reminder alert pertaining to the at least one rear seat passenger to the at least one front seat passenger.

11. The system of claim 10, wherein determining the location of the at least one rear seat passenger with respect to the location of the at least one front seat passenger includes analyzing data provided by seat weight sensors to determine the location of the at least one front seat passenger of the vehicle and the location of the at least one rear seat passenger of the vehicle.

12. The system of claim 11, further including analyzing data provided by the seat weight sensors and storing a category of the at least one rear seat passenger of the vehicle, wherein the category of the at least one rear seat passenger includes at least one of: an adult, a child, and an infant.

13. The system of claim 12, further including storing the location of the at least one front seat passenger of the vehicle, the location of the at least one rear seat passenger of the vehicle, and the category of the at least one rear seat passenger onto an occupant determination data store each time at least one ignition mode of the vehicle is enabled.

14. The system of claim 13, wherein determining the location of the at least one rear seat passenger with respect to the location of the at least one front seat passenger includes determining that at least one ignition mode of the vehicle is disabled and accessing the occupant determination data store to retrieve a latest stored determination of occupancy of the at least one front passenger seat, a latest stored determination of occupancy of the at least one rear passenger seat, and a latest stored determination of the category of the at least one rear seat passenger.

15. The system of claim 14, wherein actuating the at least one vibrational element includes actuating the at least one vibrational element disposed at a region of the at least one front passenger seat at a particular intensity level and frequency based on the latest stored determination of occupancy of the at least one front passenger seat, the latest stored determination of occupancy of the at least one rear passenger seat, and the latest stored determination of the category of the at least one rear seat passenger.

16. The system of claim 10, wherein determining if the at least one disturbance is affecting the at least one front passenger seat of the vehicle includes receiving data from seat back sensors disposed at a rear portion of the at least one front passenger seat and determining a region of the at least one front passenger seat that is affected by the at least one disturbance.

17. The system of claim 16, wherein determining if the at least one disturbance is affecting the at least one front passenger seat of the vehicle includes determining at least one disturbance level that is associated with an intensity, a direction, and a force of the at least disturbance that is placed upon the region of the at least one front passenger seat.

18. The system of claim 17, wherein actuating the at least one vibrational element includes actuating the at least one vibrational element to provide at least one counteractive vibration at the region of the at least one front passenger seat that is affected by the at least one disturbance at a level that corresponds to the at least one disturbance level.

19. A non-transitory computer readable storage medium storing instructions that when executed by a computer, which includes a processor perform a method, the method comprising:
determining that at least one front seat passenger is occupying at least one front passenger seat of a vehicle and at least one rear seat passenger is occupying at least one rear passenger seat of the vehicle;
determining a location of the at least one rear seat passenger with respect to a location of the at least one front seat passenger within the vehicle;
determining if at least one disturbance is affecting the at least one front passenger seat of the vehicle that is caused by the at least one rear seat passenger of the vehicle; and
actuating at least one vibrational element to counteract the at least one disturbance affecting the at least one front passenger seat of the vehicle and to provide a reminder alert pertaining to the at least one rear seat passenger to the at least one front seat passenger.

20. The non-transitory computer readable storage medium of claim 19, wherein actuating the at least one vibrational element includes actuating the at least one vibrational element disposed at a region of the at least one front passenger seat at a particular intensity level and frequency based on a latest stored determination of occupancy of the at least one front passenger seat, a latest stored determination of occupancy of the at least one rear passenger seat, and a latest stored determination of a category of the at least one rear seat passenger.

* * * * *